March 4, 1930.    R. EHRENFELD    1,749,574
LUBRICATING DEVICE
Filed Dec. 14, 1928
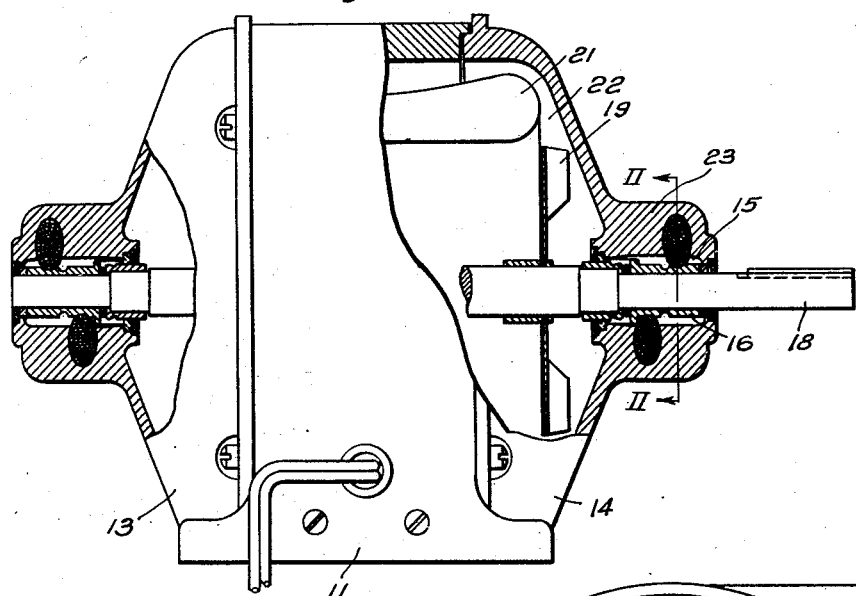
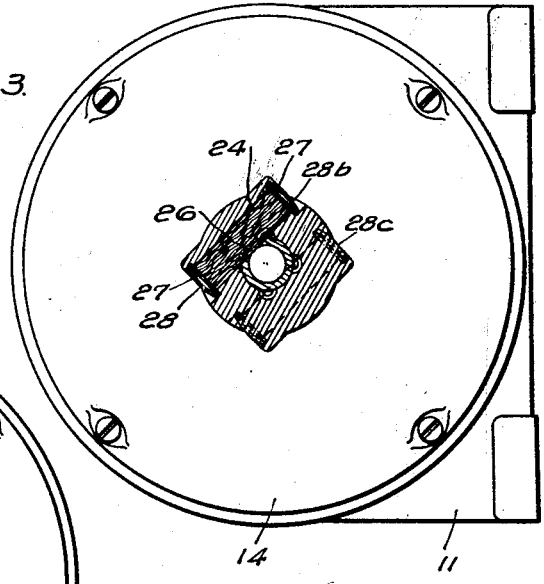
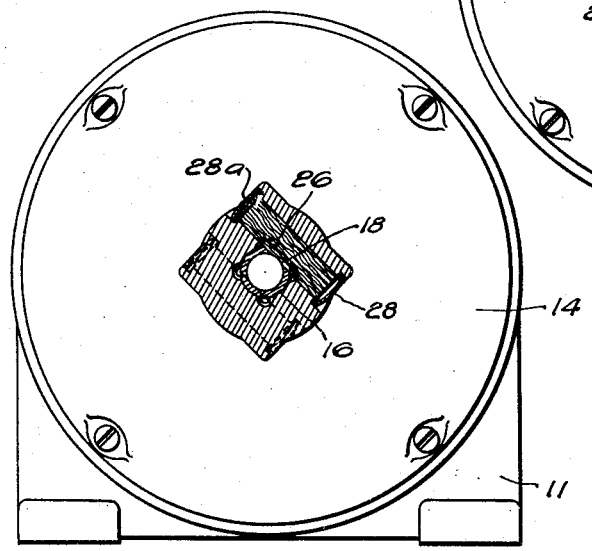
INVENTOR
Ralph Ehrenfeld.
BY
Wesley G. Carr
ATTORNEY Patented Mar. 4, 1930

1,749,574

UNITED STATES PATENT OFFICE

RALPH EHRENFELD, OF SPRINGFIELD, MASSACHUSETTS, ASSIGNOR TO WESTINGHOUSE ELECTRIC & MANUFACTURING COMPANY, A CORPORATION OF PENNSYLVANIA

LUBRICATING DEVICE

Application filed December 14, 1928. Serial No. 326,030.

My invention relates to shaft bearings and particularly to oiling systems for such bearings.

An object of my invention is to provide a reliable and simple oiling system for an electric motor that shall be fully operative regardless of the mounting position of the motor.

Another object of my invention is to provide an oiling system that shall permit of initially oiling a motor shaft bearing during manufacture of the motor, shipping the motor without loss of oil, and adding oil thereafter as may be required, irrespective of the position in which the motor may have been mounted for operation.

In practicing my invention, I provide a bearing housing for a horizontal shaft having a shaft-receiving opening therein, a pair of lubricant-receiving openings extending through the housing angularly relative to the axis of the shaft, one on each side of the shaft and angularly relative to a vertical line therethrough and puncturable sealing means at each end of the pair of openings.

Referring to the drawings in which like figures indicate like parts,

Figure 1 is a view, partly in elevation and partly in section, of a motor in which my lubricating device has been incorporated.

Fig. 2 is a view, partly in section and partly in elevation, of the motor shown in Fig. 1 mounted on a horizontal plane surface, and Fig. 3 is an end view, partly in elevation and partly in section, of the motor shown in Fig. 1, as mounted on a vertically extending plane surface.

My device may be applied to any type of bearing in which a shaft is journalled in a sleeve bearing but it is particularly applicable for use in a small motor, such as the motor shown in the drawings.

Referring to Fig. 1, the motor shown comprises a frame 11 to which are attached end bells 13 and 14 which are drilled to provide a longitudinal shaft receiving opening 15 in which a sleeve bearing 16 may be located. The shaft 18, on which the rotor (not shown) is mounted, is, in this case, provided with a fan 19, and the shaft is journalled in the sleeve bearing 16. Stator windings 21 are disposed within the enclosure 22 provided by the frame and end bells.

My device is incorporated in the bearing housing 23 surrounding the sleeve bearing and comprises two parallel openings 24 extending one on each side of the shaft at right angles to its longitudinal axis and at about 45° with regard to the horizontal plane of the base of the motor. The openings are adapted to communicate intermediate their ends with the shaft 18 through suitable openings 26 in the sleeve bearing.

Both ends of each lubricant receiving opening or oil well 24 are enlarged and a soft disc or seal 27 of soft metal, paper or the like is inserted in the enlarged portion of the well and held in place by perforated convexoconcave discs 28. The seal may easily be punctured by means of a sharp instrument inserted through the perforated protecting cap or disc.

The oil wells may be filled or packed with loose waste or prepared twists of oil soaked material.

It will be readily understood that the operation of packing the bearings with lubricating material may be completed when the motor is assembled at the factory.

All four discs or seals are put in place and the motor bearing oil well is tightly closed so that the oil will not leak out during shipment.

When the motor is received by the customer and is selectively mounted in the position in which it is to be used, the uppermost seal may be punctured when it is desired to lubricate the motor and the other three seals will remain closed, thus providing a sealed oil well, having two separate parts.

It is not necessary to remove the end bells and replace them in the correct position for oiling as has hitherto been the case. If, for instance, referring to Fig. 2, the motor is placed on a horizontally extending plane, such as the floor of the room, or the like, the uppermost seal 28a may be punctured and oil introduced into the oil well cavity. If the motor is mounted on a vertically extending surface, such as the wall of the room, the upper left end seal 28b may be punctured and again a sealed chamber having an opening at the top for introducing the oil, is provided.

It may readily be understood that the motor may be placed in any of the four positions, such as the floor, walls, or ceiling of a room, and only the uppermost seal need be punctured. The seals are readily renewable and may be replaced by removing the cap and placing of the seal in the oil well and driving the cap into place again.

It is apparent that modifications of my device may be made and that such modifications may be made without departing from the spirit and scope of my invention as set forth in the appended claims.

I claim as my invention:

1. In a lubricating system for an electric motor to be selectively mounted in any one of a plurality of positions, in combination, a bearing housing having a shaft-receiving opening therein, a plurality of lubricant-receiving openings extending through the housing angularly relative to the axis of the shaft and communicating intermediate their ends with the shaft-receiving opening, lubricant in each of said last named openings, a puncturable seal at each end of said last named openings and a perforated protecting cap for each seal, whereby selective puncturing of the uppermost seal may be effected in accordance with the motor mounting.

2. In a lubricating system for an electric motor to be selectively mounted in any one of a plurality of positions, in combination, a bearing housing having a shaft-receiving opening therein, a plurality of lubricant-receiving openings extending through the housing in parallel lines substantially at right angles to the axis of the shaft and at an angle relatively to a horizontal plane and communicating with the shaft-receiving opening intermediate their ends, lubricant in each of said lubricant-receiving openings, and a puncturable closing means at each end of said last named openings to permit of puncturing the uppermost closing means in accordance with the motor position.

3. In a lubricating system for an electric motor to be selectively mounted in any one of a plurality of positions, in combination, a bearing housing having a shaft-receiving opening therein, a pair of lubricant-receiving openings extending through the housing, one on each side of the shaft-receiving opening, in parallel extending relation substantially at right angles to the axis of the shaft and communicating with the shaft-receiving opening intermediate their ends, lubricant in each lubricant-receiving opening, a puncturable seal and a perforated protecting cap at each end of each lubricant-receiving opening, whereby selective puncturing of the uppermost seal may be effected for the addition of lubricant.

4. In a lubricant system for an electric motor to be selectively mounted in any one of a plurality of positions, in combination, a bearing housing having a shaft-receiving opening therein, a pair of lubricant-receiving openings extending through the housing, one on each side of the shaft-receiving opening, in parallel extending relation angularly relative to a horizontal plane substantially at right angles to the axis of the shaft and communicating with the shaft-receiving opening intermediate their ends, lubricant in each lubricant-receiving opening, a puncturable seal and a perforated protecting cap at each end of each lubricant-receiving opening, whereby selective puncturing of the uppermost seal may be effected for the addition of lubricant.

5. In a lubricating system for an electric motor to be selectively mounted in a plurality of positions, in combination, a bearing housing having a shaft-receiving opening therein, a pair of substantially parallel lubricant-receiving openings located one on each side of the shaft, extending at right angles to the axis of the shaft and angularly relative to a horizontal plane, lubricant in each of said lubricant-receiving openings, and puncturable sealing means in each end of each of said lubricant-receiving openings to permit of puncturing the uppermost seal in the lubricant-receiving opening located above the shaft in accordance with the motor position.

In testimony whereof, I have hereunto subscribed my name this 8th day of Decmber, 1928.

RALPH EHRENFELD.